US012155153B2

(12) United States Patent
Kamemura et al.

(10) Patent No.: US 12,155,153 B2
(45) Date of Patent: Nov. 26, 2024

(54) ELECTRICAL CONNECTOR FOR SECURING MULTIPLE INDIVIDUAL WIRES IN A HOUSING WITH FEWER PARTS

(71) Applicant: SUMITOMO WIRING SYSTEMS, LTD., Mie (JP)

(72) Inventors: Masato Kamemura, Mie (JP); Hiroki Hayashi, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 368 days.

(21) Appl. No.: 17/781,030

(22) PCT Filed: Nov. 27, 2020

(86) PCT No.: PCT/JP2020/044214
§ 371 (c)(1),
(2) Date: May 30, 2022

(87) PCT Pub. No.: WO2021/112002
PCT Pub. Date: Jun. 10, 2021

(65) Prior Publication Data
US 2022/0416475 A1 Dec. 29, 2022

(30) Foreign Application Priority Data
Dec. 2, 2019 (JP) ................................ 2019-217911

(51) Int. Cl.
*H01R 13/58* (2006.01)
*H01R 13/502* (2006.01)
(Continued)

(52) U.S. Cl.
CPC ....... *H01R 13/5825* (2013.01); *H01R 13/502* (2013.01); *H01R 13/5205* (2013.01);
(Continued)

(58) Field of Classification Search
CPC .............. H01R 13/5825; H01R 13/502; H01R 13/5205; H01R 13/582; H01R 13/639;
(Continued)

(56) References Cited

U.S. PATENT DOCUMENTS

2008/0003876 A1 1/2008 Fukaya et al.
2010/0151721 A1 6/2010 Tyler
2019/0356085 A1 11/2019 Kurita

FOREIGN PATENT DOCUMENTS

EP 3457501 A1 * 3/2019 ........... H01R 13/506
WO WO-2020196478 A1 * 10/2020 ............. H01R 13/42

OTHER PUBLICATIONS

International Search Report issued on Jan. 19, 2021 for WO 2021/112002 A1 (4 pages).

* cited by examiner

*Primary Examiner* — Justin M Kratt
(74) *Attorney, Agent, or Firm* — Venjuris, P.C.

(57) ABSTRACT

The present disclosure aims to provide a connector capable of suppressing an increase in the number of components. A retainer 50 includes a body portion 51 having a plurality of through holes through which a plurality of wires 20 are individually passed, and a plurality of holding portions 53 projecting from the body portion 51 to individually hold the plurality of wires 20. Each of the plurality of holding portions 53 includes a resilient piece 54 resiliently deformable in a second direction intersecting a first direction in which the holding portion 53 projects. A supporting member 60 is collectively mounted on outer peripheral surfaces of the plurality of holding portions 53. The supporting member 60 presses the resilient pieces 54 against outer peripheral surfaces of the wires 20.

9 Claims, 5 Drawing Sheets

(51) Int. Cl.
*H01R 13/52* (2006.01)
*H01R 13/639* (2006.01)
*H01R 13/506* (2006.01)

(52) U.S. Cl.
CPC ......... *H01R 13/582* (2013.01); *H01R 13/639* (2013.01); *H01R 13/5025* (2013.01); *H01R 13/506* (2013.01); *H01R 13/58* (2013.01); *H01R 13/5804* (2013.01); *H01R 13/5812* (2013.01)

(58) Field of Classification Search
CPC .. H01R 13/5025; H01R 13/506; H01R 13/58; H01R 13/5804; H01R 13/5812
See application file for complete search history.

ELECTRICAL CONNECTOR FOR SECURING MULTIPLE INDIVIDUAL WIRES IN A HOUSING WITH FEWER PARTS

CROSS REFERENCE TO RELATED APPLICATIONS

This application is a national phase of PCT application No. PCT/JP2020/044214, filed on 27 Nov. 2020, which claims priority from Japanese patent application No. 2019-217911, filed on 2 Dec. 2019, all of which are incorporated herein by reference.

TECHNICAL FIELD

The present disclosure relates to a connector.

BACKGROUND

Patent Document 1 discloses a connector provided with a tension release mechanism. The connector described in Patent Document 1 includes a tubular housing into which a wire with terminal is mounted, a collet arranged on one end of the housing to hold a wire ending from the housing, and a retainer mounted on the one end of the housing to fix the collet between the housing and the retainer. A sealing member for sealing between the outer peripheral surface of the wire and the inner peripheral surface of the housing is provided in the housing.

The collet includes a plurality of finger-like portions extending along an extending direction of the wire. By attaching the retainer to the housing, a plurality of ribs formed on the inner surface of the retainer are engaged with the respective finger-like portions of the collet. In this way, the respective finger-like portions press the outer peripheral surface of the wire, thereby holding the wire. According to such a tension release mechanism, even if an external force is applied to a part pulled out to the outside of the housing, out of the wire, by holding the wire at an intermediate position in the extending direction by the collet, it can be suppressed that the above external force is applied to a part located inside the housing, out of the wire.

PRIOR ART DOCUMENT

Patent Document

Patent Document 1: JP 2012-511804 A

SUMMARY OF THE INVENTION

Problems to be Solved

If the technique described in Patent Document 1 is applied to a connector in which a plurality of wires arranged in parallel are mounted in one housing, the following inconvenience occurs. That is, since as many collets and retainers as the wires are necessary, the number of components of the connector increases.

The present disclosure aims to provide a connector capable of suppressing an increase in the number of components.

Means to Solve the Problem

The present disclosure is directed to a connector with a housing, a plurality of wires being mounted into the housing, a retainer to be attached to the housing, and a supporting member to be mounted on the retainer, wherein the retainer includes a body portion having a plurality of through holes, the plurality of wires being individually passed through the plurality of through holes, and a plurality of holding portions projecting from the body portion to individually hold the plurality of wires, each of the plurality of holding portions includes a resilient piece resiliently deformable in a second direction intersecting a first direction, the holding portion projecting in the first direction, the supporting member is collectively mounted on outer peripheral surfaces of the plurality of holding portions, and the supporting member presses the resilient pieces against outer peripheral surfaces of the wires.

Effect of the Invention

According to the present disclosure, it is possible to suppress an increase in the number of components of a connector.

DETAILED DESCRIPTION TO EXECUTE THE INVENTION

Description of Embodiments of Present Disclosure

Figure 1:
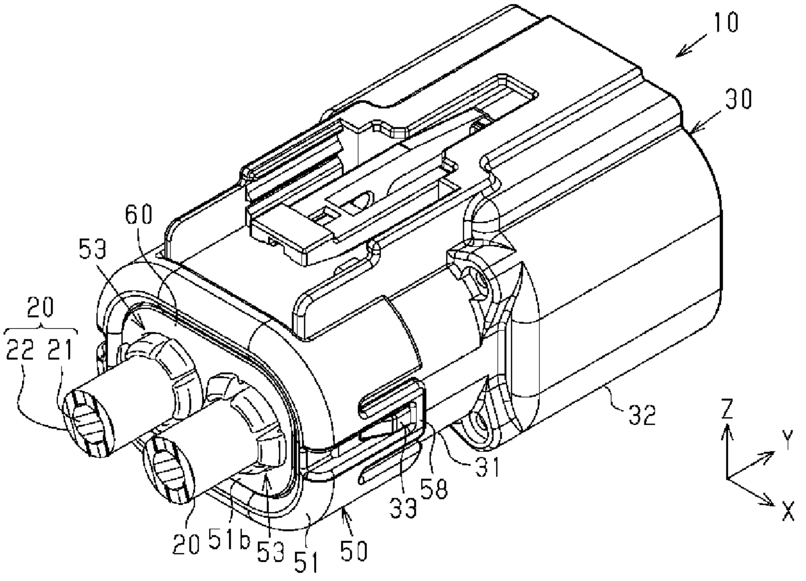
FIG. 1 is a perspective view of a connector of one embodiment.

First, embodiments of the present disclosure are listed and described.

[1] The connector of the present disclosure is provided with a housing, a plurality of wires being mounted into the housing, a retainer to be attached to the housing, and a supporting member to be mounted on the retainer, wherein the retainer includes a body portion having a plurality of through holes, the plurality of wires being individually passed through the plurality of through holes, and a plurality of holding portions projecting from the body portion to individually hold the plurality of wires, each of the plurality of holding portions includes a resilient piece resiliently deformable in a second direction intersecting a first direction, the holding portion projecting in the first direction, the supporting member is collectively mounted on outer peripheral surfaces of the plurality of holding portions, and the supporting member presses the resilient pieces against outer peripheral surfaces of the wires.

According to this configuration, the plurality of wires are held by the plurality of holding portions projecting from the body portion of one retainer and one supporting member. Thus, the number of the retainer and the supporting member can be minimized Therefore, an increase in the number of components of the connector can be suppressed.

[2] Preferably, the resilient piece includes a pressing portion projecting toward the wire in the second direction, and the pressing portion is pressed against the outer peripheral surface of the wire.

According to this configuration, the holding of the wire can be enhanced since the outer peripheral surface of the wire is pressed by the pressing portion of the resilient piece.

[3] Preferably, the resilient piece includes a restricting projection projecting away from the wire in the second direction, and the restricting projection restricts a movement of the supporting member away from the body portion in the first direction.

According to this configuration, the supporting member is restricted from moving away from the body portion in the first direction by the restricting projections of the resilient pieces. In this way, the supporting member can be prevented from coming off from the holding portions. Therefore, each wire can be stably held.

[4] Preferably, the resilient pieces include a first resilient piece having the restricting projection and a second resilient piece not having the restricting projection.

In mounting the supporting member on the holding portions including the resilient pieces having the restricting projection, the supporting member needs to ride over the restricting projections. Thus, if all of a plurality of the resilient pieces constituting the holding portions have the restricting projection, a friction force generated when the supporting member rides over the restricting projections increases and a mounting operation of the supporting member may become difficult.

On this point, according to the above configuration, the resilient pieces include the first resilient pieces having the restricting projection and the second resilient pieces not having the restricting projection. In this way, a friction force generated when the supporting member is mounted on the holding portions can be reduced as compared to the case where all of the plurality of resilient pieces are the first resilient pieces. Therefore, the mounting operation of the supporting member is facilitated.

[5] Preferably, the first resilient piece of one of two holding portions adjacent to each other and the second resilient piece of the other are adjacent to each other.

According to this configuration, an interval between center axes of the two holding portions can be reduced while an interval between two resilient pieces adjacent to each other is ensured as compared to a configuration in which the first resilient pieces of the two holding portions adjacent to each other are adjacent to each other. Therefore, an increase in the size of the retainer, consequently in the size of the connector, can be suppressed.

[6] Preferably, the second resilient piece of one of two holding portions adjacent to each other and the second resilient piece of the other are adjacent to each other.

According to this configuration, an interval between center axes of the two holding portions can be minimized while an interval between two resilient pieces adjacent to each other is ensured as compared to a configuration in which the first resilient pieces of the two holding portions adjacent to each other are adjacent to each other. Therefore, an increase in the size of the retainer, consequently in the size of the connector, can be suppressed.

[7] Preferably, the restricting projection is provided on a tip of the resilient piece, and an inclined portion inclined to be located more away from the wire in the second direction toward the tip of the resilient piece is provided on an inner surface of the resilient piece.

In mounting the supporting member on the holding portions including the resilient pieces having the restricting projection, the supporting member needs to ride over the restricting projections. Here, when the supporting member rides over the restricting projections, the resilient pieces are deflected toward the wires in the second direction, whereby a large load may be applied to the wires by the inner surfaces of the resilient pieces, particularly parts of the inner surfaces on the back side of the restricting projections, being strongly pressed against the outer peripheral surfaces of the wires.

On this point, according to the above configuration, a gap is formed between the inner surface of the resilient piece and the outer peripheral surface of the wire by the inclined portion provided on the inner surface of the resilient piece. Thus, it can be suppressed that the inner surface of the resilient piece is strongly pressed against the outer peripheral surface of the wire when the resilient piece is deflected toward the wire in the second direction. Therefore, it can be suppressed that a large load is applied to the wire.

[8] Preferably, the body portion includes a recess recessed toward the housing in the first direction, each of the holding portions projects from an outer surface of the recess, and the supporting member is accommodated in the recess.

According to this configuration, the outer periphery of the supporting member is covered by the recess since the supporting member is accommodated in the recess of the body portion. Thus, it can be suppressed that the supporting member is separated from each holding portion due to the contact of a peripheral component with the supporting member.

[9] Preferably, the recess is located in the housing.

According to this configuration, the holding portions can be provided closer to the housing in the first direction by as much as the recess is located in the housing. Therefore, an increase in the size of the connector in the first direction can be suppressed.

Details of Embodiment of Present Disclosure

Specific examples of a connector of the present disclosure are described below with reference to the drawings. In each figure, some of components may be shown in an exaggerated or simplified manner for the convenience of description. Further, a dimension ratio of each part may be different in each figure. Note that the present disclosure is not limited to these illustrations and is intended to be represented by claims and include all changes in the scope of claims and in the meaning and scope of equivalents. “Orthogonal” in this specification means not only strictly orthogonal, but also substantially orthogonal within a range in which functions and effects in an embodiment are achieved.

<Overall Configuration of Connector 10>

Figure 2:
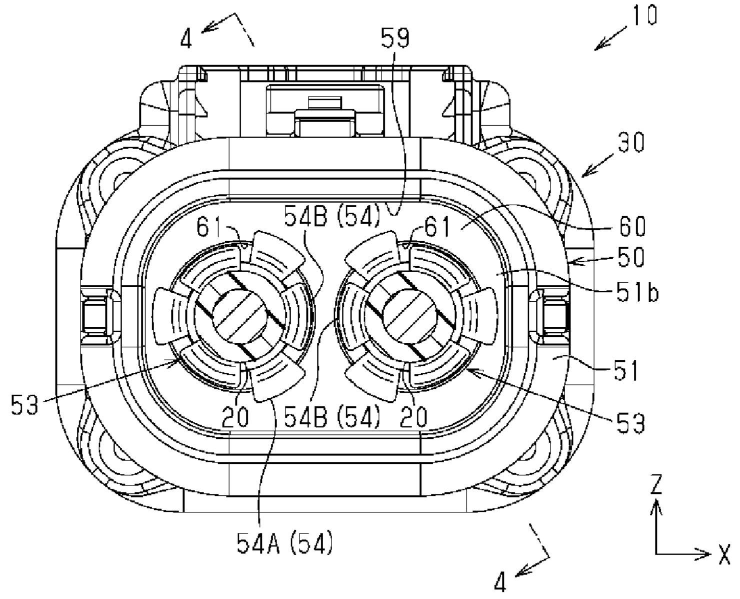
FIG. 2 is a front view of the connector of the embodiment.

As shown in FIGS. 1 and 2, a connector 10 includes a housing 30 in which a plurality of wires 20 arranged in parallel are mounted, a sealing member 40 (see FIG. 4) for sealing between the outer peripheral surface of each wire 20 and the inner peripheral surface of the housing 30, and a retainer 50 for retaining the sealing members 40 by being attached to the housing 30. A supporting member 60 is mounted on the retainer 50.

The connector 10 can be used in an arbitrary posture, but the configuration of the connector 10 is described with an extending direction of the wires 20 set as a front-rear direction in this embodiment. Note that, out of XYZ axes in each figure, the X axis represents a width direction of the connector 10, the Y axis represents the front-rear direction of the connector 10 orthogonal to the X axis, and the Z axis represents a vertical direction of the connector 10 orthogonal to both the X axis and the Y axis. In the following description, a direction extending along the X axis is referred to as a width direction X, a direction extending along the Y axis is referred to as a front-rear direction Y and a direction along the Z axis is referred to as a vertical direction Z for the sake of convenience. Further, in the following description, a direction of an arrow Z in FIG. 1 is an upward direction and an opposite direction is a downward direction. Further, a direction of an arrow Y is a forward direction and an opposite direction is a rearward direction.

Two wires 20 extending in parallel in the width direction X are passed through the housing 30 of this embodiment.

<Configuration of Wires 20>

As shown in FIG. 1, each wire 20 includes a conductive core 21 and an insulation coating 22 made of resin for covering the outer periphery of the core 21. An unillustrated metal terminal to be accommodated into the housing 30 is provided on the tip of the core 21 exposed from the insulation coating 22 in each wire 20.

<Configuration of Housing 30>

Figure 3:
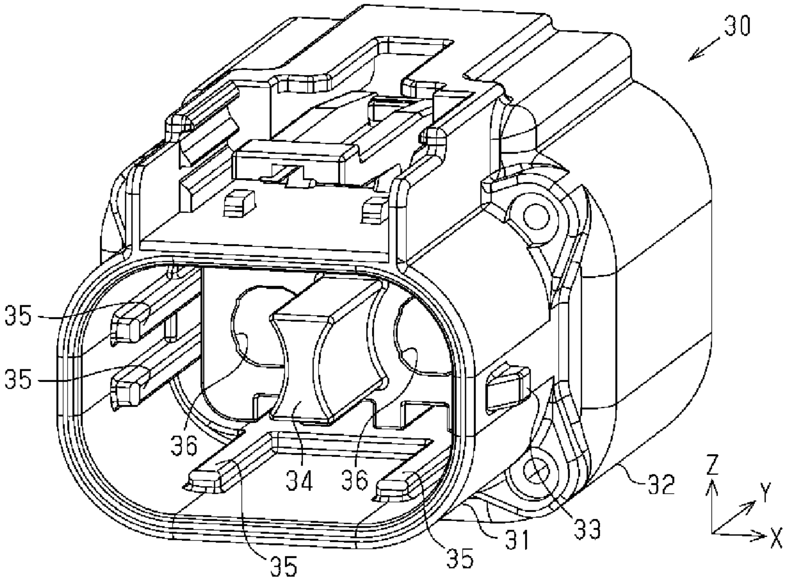
FIG. 3 is a perspective view of a housing of the embodiment.

As shown in FIG. 3, the housing 30 includes a tubular first receptacle 31 open rearward in the front-rear direction Y and a tubular second receptacle 32 open forward in the front-rear direction Y. The first and second receptacles 31, 32 are both in the form of a rectangular tube long in the width direction X. Outside dimensions of the second receptacle 32 are one size larger than those of the first receptacle 31.

A pair of locking projections 33 for locking the retainer 50 are provided on both sides in the width direction X of the first receptacle 31.

A partition wall 34 projecting rearward from the rear end of the second receptacle 32 and partitioning the two wires 20 inside the housing 30 is provided inside the first receptacle 31.

A plurality of ribs 35 extending along the front-rear direction Y are provided on the inner peripheral surface of the first receptacle 31 while being spaced apart from each other in a circumferential direction of this inner peripheral surface. The rear end of each rib 35 is located more inward of the first receptacle 31, i.e. more forward, than the opening edge of the first receptacle 31.

Two through holes 36 through which the respective wires 20 are mounted are provided side by side in the width direction X in the second receptacle 32. An axial direction of each through hole 36 coincides with the front-rear direction Y.

<Configuration of Sealing Member 40>

Figure 4:
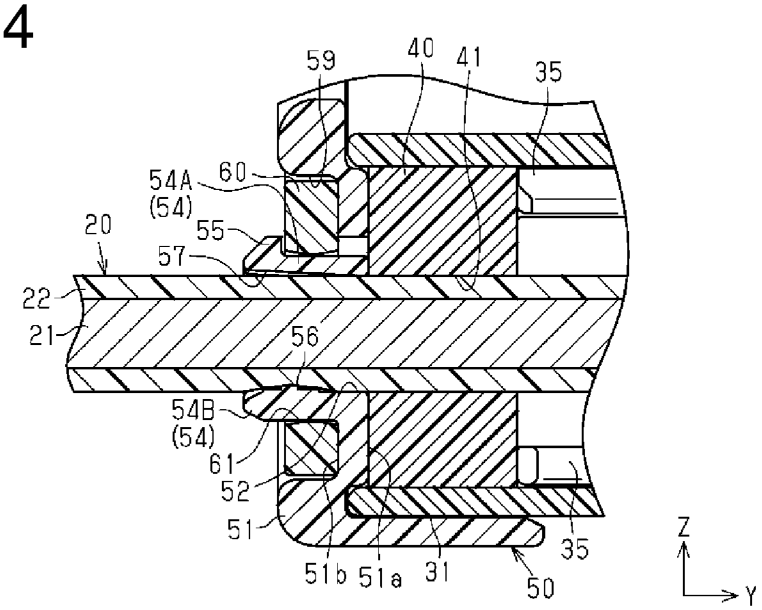
FIG. 4 is a section along 4-4 of FIG. 2.

As shown in FIG. 4, the sealing member 40 is accommodated in the first receptacle 31. The sealing member 40 has an oval shape long in the width direction X in a front view. The sealing member 40 includes two through holes 41, through which the two wires 20 are passed. The sealing member 40 is in contact with the rear ends of the respective ribs 35 and restricted from moving forward. By passing each wire 20 through the sealing member 40, sealing is provided between the outer peripheral surface of each wire 20 and the inner peripheral surface of the housing 30.

<Configuration of Retainer 50>

Figure 5:
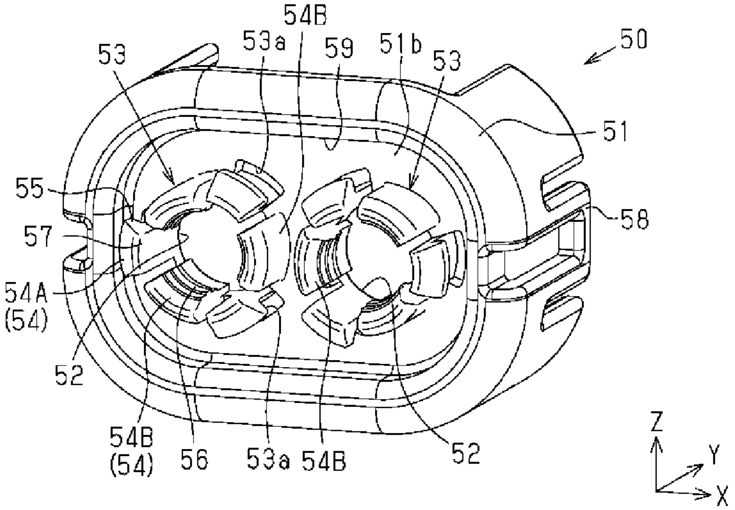
FIG. 5 is a perspective view of a retainer of the embodiment.
Figure 6:
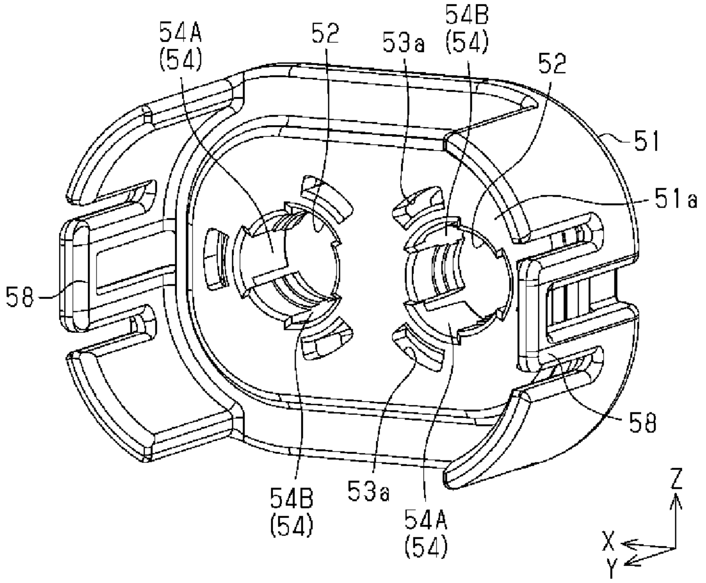
FIG. 6 is a perspective view of the retainer of the embodiment.

As shown in FIGS. 5 and 6, the retainer 50 includes a body portion 51 having a plurality of through holes 52, through which the plurality of wires 20 are individually passed, and a plurality of holding portions 53 projecting in a first direction from the body portion 51 to individually hold the plurality of wires 20.

The retainer 50 of this embodiment is provided with two through holes 52 and two holding portions 53. An axial direction of each through hole 52 coincides with the front-rear direction Y.

The respective holding portions 53 are provided side by side in the width direction X. A center axis of each holding portion 53 coincides with a center axis of each through hole 52.

A circumferential direction of the through hole 52 is merely referred to as a circumferential direction and a radial direction of the through hole 52 is merely referred to as a radial direction below.

The body portion 51 includes a recess 59 recessed in the first direction, i.e. toward the housing 30 in the front-rear direction Y. The recess 59 has an oval shape long in the width direction X. The recess 59 has a first surface 51*a* facing the first receptacle 31 of the housing 30 and a second surface 51*b* opposite to the first surface 51*a*. The first and second surfaces 51*a*, 51*b* are orthogonal to the front-rear direction Y. Each through hole 52 penetrates through the first and second surfaces 51*a*, 51*b*. Each holding portion 53 projects from the second surface 51*b*. In this embodiment, the first direction in which the holding portions 53 project coincides with the front-rear direction Y. Note that the second surface 51*b* corresponds to an outer surface of the recess 59.

As shown in FIG. 4, a part of a front side of the recess 59 is located inside the first receptacle 31. More particularly, the first surface 51*a* of the recess 59 is located inside the first receptacle 31, and the second surface 51*b* is located outside the first receptacle 31.

As shown in FIG. 5, a pair of locking portions 58 to be locked to the respective locking projections 33 on the first receptacle 31 of the housing 30 are provided on both sides in the width direction X of the body portion 51. The respective locking projections 33 and the respective locking portions 58 are locked to each other, whereby the retainer 50 is attached to the housing 30.

Each holding portion 53 includes a plurality of resilient pieces 54 projecting rearward from the body portion 51 and resiliently deformable in a second direction intersecting the first direction. The plurality of resilient pieces 54 are spaced apart from each other in the circumferential direction. The plurality of resilient pieces 54 constituting the holding portion 53 include a plurality of first resilient pieces 54A having a restricting projection 55 to be described later and a plurality of second resilient pieces 54B not having the restricting projection 55. In this embodiment, the first resilient pieces 54A and the second resilient pieces 54B are alternately provided in the circumferential direction. Each holding portion 53 in this embodiment includes three first resilient pieces 54A and three second resilient pieces 54B. The second direction in this embodiment is a direction orthogonal to the first direction, i.e. the front-rear direction Y.

The second resilient piece 54B of one of the two holding portions 53 adjacent to each other and the second resilient piece 54B of the other are adjacent to each other in the width direction X.

Each resilient piece 54A, 54B projects rearward from an edge part of the through hole 52. Each resilient piece 54A, 54B has an arcuate cross-sectional shape orthogonal to the front-rear direction Y.

The outer surfaces of the respective first resilient pieces 54A and those of the respective second resilient pieces 54B in one holding portion 53 are located on the same circumference centered on an axis of the through hole 52.

A through hole 53*a* penetrating through the body portion 51 in the front-rear direction Y is provided adjacent to the first resilient piece 54A in a part radially outward of the base end of each first resilient piece 54 in the body portion 51. The through hole 53*a* has an arcuate cross-sectional shape along the outer surface of the first resilient piece 54. Thus, the first resilient piece 54 is coupled to the body portion 51 on both end parts in the circumferential direction. In this way, the first resilient piece 54 is easily deflected radially inward.

As shown in FIGS. 4 and 5, the restricting projection 55 projecting away from the wire 20 in the second direction is provided on the tip of the first resilient piece 54. The outer surface of a rear side of the restricting projection 55 is inclined radially outward toward the front.

A pressing portion 56 projecting toward the wire 20 in the second direction is provided in a center part in the front-rear direction Y of the inner surface of each second resilient piece 54B. The pressing portion 56 is pressed against the outer peripheral surface of the wire 20. The pressing portion 56 has such a step shape that a projecting amount increases stepwise from both sides in the front-rear direction Y. Note that the inner surface of the pressing portion 56 is arcuately curved to extend along the outer peripheral surface of the wire 20 in the circumferential direction.

An inclined portion 57 inclined to be located more radially outward toward the tip of the first resilient piece 54A is provided on the inner surface of the first resilient piece 54A. The inclined portion 57 is provided over the entire first resilient piece 54A in the front-rear direction Y.

<Configuration of Supporting Member 60>

As shown in FIGS. 1, 2 and 4, the supporting member 60 is collectively mounted on the outer peripheral surfaces of the plurality of holding portions 53 of the retainer 50.

The supporting member 60 has an oval shape long in the width direction X. The supporting member 60 is made of resin. The entire supporting member 60 is accommodated inside the recess 59. In this way, the outer periphery of the supporting member 60 is covered by the recess 59.

The supporting member 60 has two through holes 61, through which the respective wires 20 are passed.

The supporting member 60 presses the respective resilient pieces against the outer peripheral surfaces of the wires 20. The supporting member 60 is restricted from moving away from the body portion 51 in the first direction by the restricting projections 55.

A function of this embodiment is described.

In the connector 10, the two wires 20 are held by the two holding portions 53 projecting from the body portion 51 of one retainer 50 and one supporting member 60. Thus, the numbers of the retainer 50 and the supporting member 60 can be minimized.

Effects of this Embodiment are Described (1) The retainer 50 includes the body portion 51 having the plurality of through holes 52 through which the plurality of wires 20 are individually passed, and the plurality of holding portions 53 projecting from the body portion 51 to individually hold the plurality of wires 20. Each of the plurality of holding portions 53 includes the resilient pieces 54 resiliently deformable in the second direction intersecting the first direction in which the holding portion 53 projects. The supporting member 60 is collectively mounted on the outer peripheral surfaces of the plurality of holding portions 53. The supporting member 60 presses the resilient pieces 54 against the outer peripheral surfaces of the wires 20.

According to this configuration, an increase in the number of components of the connector 10 can be suppressed since the above function is achieved.

(2) The resilient piece 54 includes the pressing portion 56 projecting toward the wire 20 in the second direction. The pressing portion 56 is pressed against the outer peripheral surface of the wire 20.

According to this configuration, the holding of the wire 20 can be enhanced since the outer peripheral surface of the wire 20 is pressed by the pressing portions 56 of the resilient pieces 54.

(3) The resilient piece 54 includes the restricting projection 55 projecting away from the wire 20 in the second direction. The restricting projection 55 restricts a movement of the supporting member 60 away from the body portion 51 in the first direction.

According to this configuration, the supporting member 60 is restricted from moving away from the body portion 51 in the first direction by the restricting projections 55 of the resilient pieces 54. In this way, the supporting member 60 can be prevented from coming off from the holding portion 53. Therefore, each wire 20 can be stably held.

(4) The resilient pieces 54 include the first resilient pieces 54A having the restricting projection 55 and the second resilient pieces 54B not having the restricting projection 55.

In mounting the supporting member 60 on the holding portions 53 including the resilient pieces 54 having the restricting projection 55, the supporting member 60 needs to ride over the restricting projections 55. Thus, if all of the plurality of resilient pieces 54 constituting the holding portions 53 have the restricting projection 55, a friction force generated when the supporting member 60 rides over the restricting projections 55 increases and a mounting operation of the supporting member 60 may become difficult.

On this point, according to the above configuration, the plurality of resilient pieces 54 constituting the holding portions 53 include the first resilient pieces 54A having the restricting projection 55 and the second resilient pieces 54B not having the restricting projection 55. In this way, a friction force generated when the supporting member 60 is mounted on the holding portions 53 can be reduced as compared to the case where all of the plurality of resilient pieces 54 are the first resilient pieces 54A. Therefore, the mounting operation of the supporting member 60 is facilitated.

(5) The second resilient piece 54B of one of the two holding portions 53 adjacent to each other and the second resilient piece 54B of the other are adjacent to each other.

According to this configuration, an interval between center axes of the two holding portions 53 can be minimized while an interval between two resilient pieces 54 adjacent to each other is ensured as compared to a configuration in which the first resilient pieces 54A of the two holding portions 53 adjacent to each other are adjacent to each other. Therefore, an increase in the size of the retainer 50, consequently in the size of the connector 10, can be suppressed.

(6) The restricting projection 55 is provided on the tip of the resilient piece 54, and the inclined portion 57 inclined to be located more away from the wire 20 in the second direction toward the tip of the resilient piece 54 is provided on the inner surface of the resilient piece 54.

In mounting the supporting member 60 on the holding portions 53 including the resilient pieces 54 having the restricting projection 55, the supporting member 60 needs to ride over the restricting projections 55. Here, when the supporting member 60 rides over the restricting projections 55, the resilient pieces 54 are deflected toward the wires 20 in the second direction, whereby a large load may be applied to the wires 20 by the inner surfaces of the resilient pieces 54, particularly the parts of the inner surfaces on the back sides of the restricting projections 55, being strongly pressed against the outer peripheral surfaces of the wires 20.

On this point, according to this embodiment, gaps are formed between the inner surfaces of the resilient pieces 54 and the outer peripheral surfaces of the wires 20 by the inclined portions 57 provided on the inner surfaces of the resilient pieces 54. Thus, it can be suppressed that the inner surfaces of the resilient pieces 54 are strongly pressed against the outer peripheral surfaces of the wires 20 when the resilient pieces 54 are deflected toward the wire 20 in the second direction. Therefore, it can be suppressed that a large load is applied to the wires 20.

(7) The body portion 51 includes the recess 59 recessed toward the housing 30 in the first direction. Each holding portion 53 projects from the second surface 51*b* of the recess 59. The supporting member 60 is accommodated inside the recess 59.

According to this configuration, the outer periphery of the supporting member 60 is covered by the recess 59 since the supporting member 60 is accommodated inside the recess 59 of the body portion 51. Thus, it can be suppressed that the supporting member 60 is separated from each holding portion 53 due to the contact of a peripheral component of the connector or the like with the supporting member 60.

(8) The recess 59 is partially located inside the housing 30.

According to this configuration, the holding portions 53 can be provided closer to the housing 30 in the first direction by as much as the recess 59 is located inside the housing 30. Thus, an increase in the size of the connector 10 in the first direction can be suppressed.

<Modifications>

This embodiment can be modified and carried out as follows. This embodiment and the following modifications can be carried out in combination without technically contradicting each other.

Note that, in the following first modification, second modification and third modification respectively shown in FIGS. 7, 8 and 9, repeated description is omitted by denoting the same components as those of the above embodiment by the same reference signs and denoting corresponding components by reference signs "1", "2**" and "3**" obtained by adding "100", "200" and "300" to the reference signs "" of the above embodiment.

Figure 7:
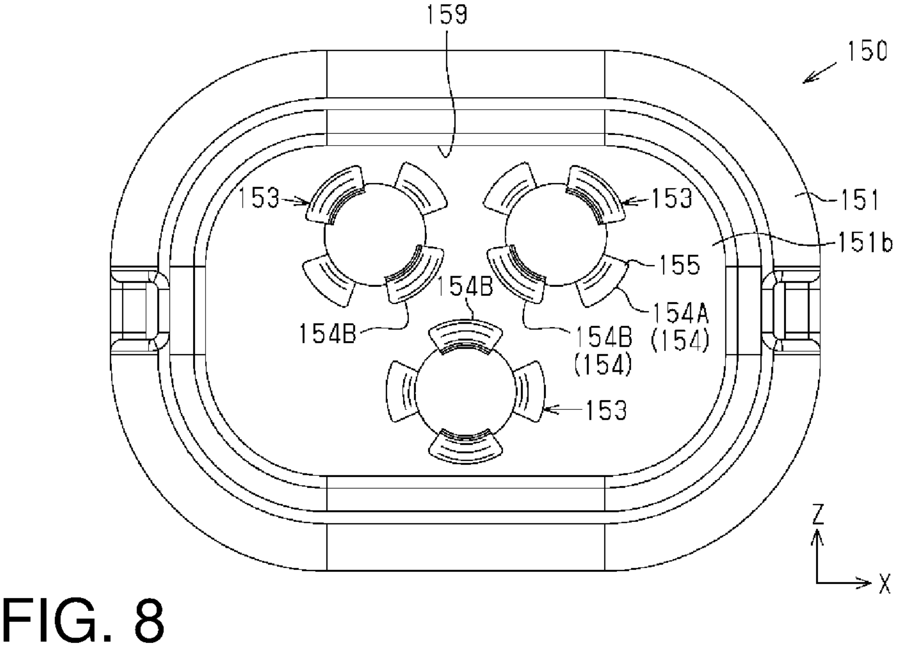
FIG. 7 is a front view of a retainer of a first modification.

As shown in FIG. 7, if a retainer 150 includes three holding portions 153, the respective holding portions 153 may be so arranged that center axes of the three holding portions 153 are located on vertices of a triangle when the retainer 150 is viewed from behind. The retainer 150 of the first modification includes two holding portions 153 provided side by side in the width direction X in an upper part of a body portion 151 and one holding portion 153 provided in a part below these holding portions 153. The arrangement of such three holding portions 153 is referred to as a triangular arrangement below.

In the above triangular arrangement, a second resilient piece 154B of one of two holding portions 153 adjacent to each other and a second resilient piece 154B of the other may be adjacent to each other. According to this configuration, a distance between the resilient pieces 154 can be reduced as compared to a triangular arrangement in which first resilient pieces 154A are arranged adjacent to each other. Thus, an interval between the center axes of the two holding portions 153 can be minimized while an interval between the two resilient pieces 154 adjacent to each other is ensured. Therefore, an increase in the size of a retainer 150, consequently in the size of the connector 10, can be suppressed.

Figure 8:
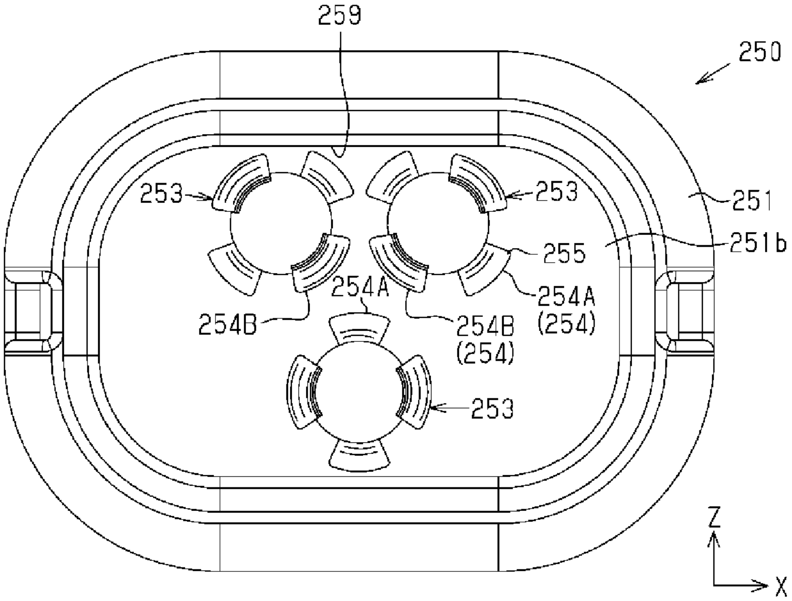
FIG. 8 is a front view of a retainer of a second modification.

As shown in FIG. 8, holding portions 253 may be so arranged that a first resilient piece 254A of one holding portion 253 located below in a triangular arrangement and second resilient pieces 254B of two holding portions 253 located above are adjacent to each other. Even in this case, an interval between center axes of the two holding portions 253 can be reduced while an interval between two resilient pieces 254 adjacent to each other is ensured as compared to a triangular arrangement in which the first resilient pieces 254A are arranged adjacent to each other. Therefore, an increase in the size of a retainer 250, consequently in the size of the connector 10, can be suppressed.

Figure 9:
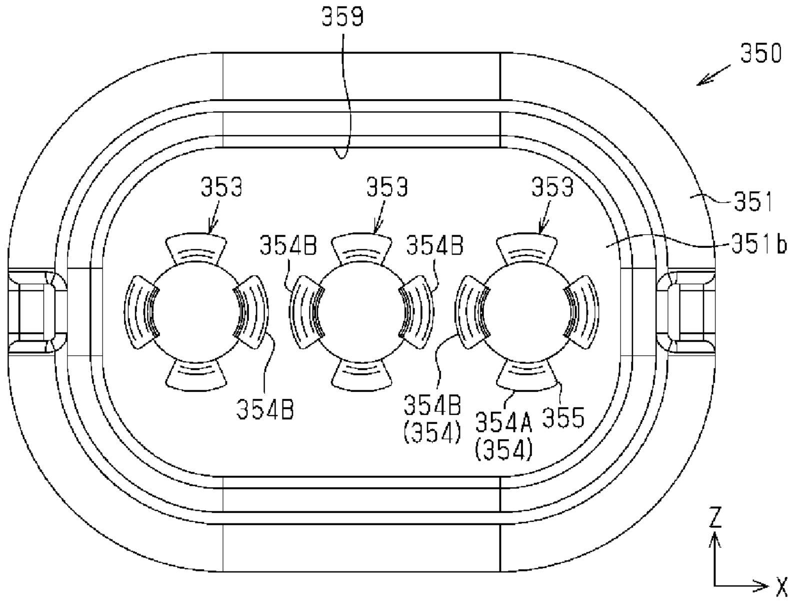
FIG. 9 is a front view of a retainer of a third modification.

As shown in FIG. 9, three holding portions 353 may be arranged side by side in a row in the width direction X. In this case, as shown in FIG. 9, the respective holding portions 353 may be so arranged that second resilient pieces 354B of the respective holding portions 353 are adjacent to each other in an arrangement direction of the respective holding portions 353. Further, the respective holding portions 353 may be so arranged that a first resilient piece 354A of one holding portion 353 and the second resilient piece 354B of another holding portion 353 are adjacent to each other in the arrangement direction.

The first resilient piece 54A of one of the two holding portions 53 adjacent to each other and the first resilient piece 54A of the other may be adjacent to each other.

The first surface 51*a* and second surface 51*b* of the recess 59 may be located inside the first receptacle 31.

The first surface 51*a* of the recess 59 may not be located inside the first receptacle 31. For example, the first surface 51*a* may be flush with the rear end surface of the first receptacle 31 of the housing 30 or may be separated rearward from this rear end surface.

The recess 59 may not cover the outer periphery of the supporting member 60 over the entire periphery, but may partially cover the outer periphery of the supporting member 60.

The recess 59 may be omitted.

The inclined portions 57 may be omitted.

The first resilient pieces 54A may be omitted. That is, the holding portion 53 may include only the second resilient pieces 54B.

The pressing portions 56 may be omitted and the outer peripheral surface of the wire 20 may be pressed by the entire inner surfaces of the first resilient pieces 54A.

The restricting projection 55 may be provided on a side closer to the base end than the tip of the first resilient piece 54A.

The restricting projections 55 may be omitted.

The number of the wires 20 to be mounted into the connector 10 may be two, four or more. In this case, the retainer 50 including a plurality of holding portions 53 corresponding to the number of the wires 20 may be prepared.

The supporting member 60 is not limited to the one made of resin, and may be, for example, made of metal.

Although the second direction is a direction orthogonal to the first direction in the above embodiment, there is no limitation to this and the second direction may be a direction intersecting the first direction at an arbitrary angle.

The present disclosure includes the following implementation examples. Reference numerals of several constituent elements of illustrative embodiments are given not for limitation, but for understanding assistance. Matters described in the following implementation examples may be partly omitted or several of the matters described in the implementation examples may be selected or extracted and combined.

[Addendum 1] A connector (10) according to one or more implementation examples of the present disclosure is provided with:

- a housing (30) into which a plurality of wires (20) are mounted;
- a retainer (50, 150, 250, 350) to be attached to the housing and including a body portion (51, 151, 251, 351) having a first surface (51*a*) facing the housing, a second surface (51*b*) on a side opposite to the first surface and a plurality of through holes (35) extending from the first surface to the second surface, the plurality of wires being individually passed through the plurality of through holes, the second surface having a plurality of opening edge parts defining openings of the plurality of through holes, and a plurality of holding portions (53, 153, 253, 353) provided on the second surface of the body portion to individually hold the plurality of wires, each of the plurality of holding portions having a plurality of resiliently deformable resilient pieces (54, 154, 254, 354) projecting from the corresponding opening edge part on the second surface of the body portion; and a supporting member (60) for supporting the plurality of holding portions, the supporting member (60) being collectively mounted on outer peripheral surfaces of the plurality of resilient pieces of the plurality of holding portions to press the plurality of resilient pieces of the plurality of holding portions against the outer peripheral surfaces of the corresponding wires.

[Addendum 2] In several implementation examples of the present disclosure, the plurality of resilient pieces of each of the plurality of holding portions may be arranged around the corresponding opening along the corresponding opening edge part of the second surface of the body portion, and the adjacent resilient pieces may be arranged at a distance from each other.

[Addendum 3] In several implementation examples of the present disclosure, each of the plurality of resilient pieces may have a holding surface (56) facing the corresponding wire and an outer peripheral surface on a side opposite to the holding surface.

[Addendum 4] In several implementation examples of the present disclosure, each of the plurality of resilient pieces may include a pressing portion (56) projecting from the holding surface (56).

[Addendum 5] In several implementation examples of the present disclosure, the pressing portion (56) of each of the plurality of resilient pieces may be located at an intermediate position between a base end and a tip of the resilient piece.

[Addendum 6] In several implementation examples of the present disclosure, each of the plurality of resilient pieces may include a restricting projection (55) projecting from the outer peripheral surface of the tip of the resilient piece.

[Addendum 7] In several implementation examples of the present disclosure, the plurality of resilient pieces of each of the plurality of holding portions may include first resilient pieces (54A) having the restricting projection and second resilient pieces (54B) not having the restricting projection.

[Addendum 8] In several implementation examples of the present disclosure, the first resilient pieces (54A) and the second resilient pieces (54B) may be alternately arranged along the corresponding opening edge part of the second surface of the body portion.

[Addendum 9] In several implementation examples of the present disclosure, the second surface of the body portion may include a recess (59, 159, 259, 359) recessed toward the housing and having a bottom surface, the plurality of opening edge parts and the plurality of holding portions may be arranged on the bottom surface of the recess and the supporting member may be accommodated in the recess.

[Addendum 10] In several implementation examples of the present disclosure, the supporting member may include a plurality of through holes respectively aligned with the plurality of through holes of the body portion and a plurality of inner peripheral surfaces respectively defining the plurality of through holes, and each of the plurality of through holes of the supporting member may have a diameter set such that the corresponding inner peripheral surface of the supporting member contacts the outer peripheral surfaces of the plurality of resilient pieces of the corresponding holding portion.

[Addendum 11] In several implementation examples of the present disclosure, the supporting member is in the form of a flat plate and dimensioned to be fit into the recess.

LIST OF REFERENCE NUMERALS s

X width direction
Y front-rear direction
Z vertical direction
10 connector
20 wire
21 core
22 insulation coating
30 housing
31 first receptacle
32 second receptacle
33 locking projection
34 partition wall
35 rib
36 through hole
40 sealing member
41 through hole
50 retainer
51 body portion
51*a* first surface
51*b* second surface (outer surface)
52 through hole
53 holding portion
53*a* through hole
54 resilient piece
54A first resilient piece
54B second resilient piece
55 restricting projection
56 pressing portion
57 inclined portion
58 locking portion
59 recess
60 supporting member
61 through hole
150 retainer
151 body portion
15 lb second surface
153 holding portion
154 resilient piece
154A first resilient piece
154B second resilient piece
155 restricting projection
159 recess
250 retainer

251 body portion
251*b* second surface
253 holding portion
254 resilient piece
254A first resilient piece
254B second resilient piece
255 restricting projection
259 recess
350 retainer
351 body portion
351*b* second surface
353 holding portion
354 resilient piece
354A first resilient piece
354B second resilient piece
355 restricting projection
359 recess

What is claimed is:

1. A connector, comprising:
a housing, a plurality of wires being mounted into the housing;
a retainer to be attached to the housing; and
a supporting member to be mounted on the retainer, wherein:
the retainer includes a body portion having a plurality of through holes, the plurality of wires being individually passed through the plurality of through holes, and a plurality of holding portions projecting from the body portion to individually hold the plurality of wires,
each of the plurality of holding portions includes a resilient piece resiliently deformable in a second direction intersecting a first direction, the holding portion projecting in the first direction,
the supporting member is collectively mounted on outer peripheral surfaces of the plurality of holding portions, and
the supporting member presses the resilient pieces against outer peripheral surfaces of the wires.

2. The connector according to claim 1, wherein:
the resilient piece includes a pressing portion projecting toward the wire in the second direction, and
the pressing portion is pressed against the outer peripheral surface of the wire.

3. The connector according to claim 1, wherein:
the resilient piece includes a restricting projection projecting away from the wire in the second direction, and
the restricting projection restricts a movement of the supporting member away from the body portion in the first direction.

4. The connector according to claim 3, wherein the resilient pieces include:
a first resilient piece having the restricting projection; and
a second resilient piece not having the restricting projection.

5. The connector according to claim 4, wherein the first resilient piece of one of two holding portions adjacent to each other and the second resilient piece of the other are adjacent to each other.

6. The connector according to claim 4, wherein the second resilient piece of one of two holding portions adjacent to each other and the second resilient piece of the other are adjacent to each other.

7. The connector according to claim 3, wherein:
the restricting projection is provided on a tip of the resilient piece, and
an inclined portion inclined to be located more away from the wire in the second direction toward the tip of the resilient piece is provided on an inner surface of the resilient piece.

8. The connector according to claim 1, wherein:
the body portion includes a recess recessed toward the housing in the first direction,
each of the holding portions projects from an outer surface of the recess, and
the supporting member is accommodated in the recess.

9. The connector according to claim 8, wherein the recess is located in the housing.

* * * * *